(12) United States Patent
Lelio

(10) Patent No.: US 11,472,142 B2
(45) Date of Patent: Oct. 18, 2022

(54) METHOD AND STATION FOR THE SKIVING OF A TIRE CASING DURING RETREADING

(71) Applicant: BRIDGESTONE EUROPE NV/SA, Zaventem (BE)

(72) Inventor: Luca Lelio, Rome (IT)

(73) Assignee: Bridgestone Europe NV/SA, Zaventem (BE)

(*) Notice: Subject to any disclaimer, the term of this patent is extended or adjusted under 35 U.S.C. 154(b) by 804 days.

(21) Appl. No.: 16/464,825

(22) PCT Filed: Dec. 5, 2017

(86) PCT No.: PCT/EP2017/081571
§ 371 (c)(1),
(2) Date: May 29, 2019

(87) PCT Pub. No.: WO2018/104332
PCT Pub. Date: Jun. 14, 2018

(65) Prior Publication Data
US 2019/0283354 A1    Sep. 19, 2019

(30) Foreign Application Priority Data
Dec. 6, 2016 (IT) .......................... 102016000123639

(51) Int. Cl.
*G01M 17/02* (2006.01)
*B29D 30/54* (2006.01)
(Continued)

(52) U.S. Cl.
CPC .............. *B29D 30/54* (2013.01); *B24B 5/366* (2013.01); *B24B 49/165* (2013.01);
(Continued)

(58) Field of Classification Search
CPC ................................................... G01M 17/027
See application file for complete search history.

(56) References Cited

U.S. PATENT DOCUMENTS 5,759,322 A * 6/1998 Courel .................... B29C 66/71
156/96
6,758,931 B1 * 7/2004 Daugherty ............. B29D 30/54
156/405.1
(Continued)

FOREIGN PATENT DOCUMENTS

| EP | 0 514 162 | 11/1992 |
| JP | 2008-128790 A | 6/2008 |
| WO | WO-2010/115711 A1 | 10/2010 |

OTHER PUBLICATIONS

International Search Report and Written Opinion from corresponding PCT Application No. PCT/EP2017/081571, dated Jan. 24, 2018, pp. 1-12.

*Primary Examiner* — Eric S. McCall

(57) ABSTRACT

Method and station for the skiving of the equatorial surface of the casing of a pneumatic tire during a retreading process of the same pneumatic tire; the old worn tread is removed from the pneumatic tire in order to expose the equatorial surface of the casing of the pneumatic tire; the presence of any damage on the equatorial surface of the casing is identified by capturing a three-dimensional profile of the equatorial surface of the casing by means of a laser type profilometer and by analyzing the same three-dimensional profile; and the equatorial surface of the casing is skived where there is damage resulting from the formation of craters on the equatorial surface.

10 Claims, 4 Drawing Sheets

(51) Int. Cl.
  *B24B 5/36* (2006.01)
  *B24B 49/16* (2006.01)
(52) U.S. Cl.
  CPC ..... *G01M 17/027* (2013.01); *B29D 2030/541* (2013.01); *B29D 2030/546* (2013.01)

(56) References Cited

U.S. PATENT DOCUMENTS

| | | | |
|---|---|---|---|
| 6,899,778 B1* | 5/2005 | Gridley | B29D 30/54 156/95 |
| 11,247,424 B1* | 2/2022 | Barned | C08K 3/36 |
| 2004/0256057 A1* | 12/2004 | Gridley | B29D 30/54 156/96 |
| 2010/0261412 A1 | 10/2010 | Manuel et al. | |
| 2012/0086566 A1 | 4/2012 | Carney | |
| 2012/0193012 A1 | 8/2012 | Lelio | |
| 2014/0353862 A1 | 12/2014 | Erdman | |
| 2016/0347015 A1* | 12/2016 | Otting | B29D 30/56 |

* cited by examiner

METHOD AND STATION FOR THE SKIVING OF A TIRE CASING DURING RETREADING

CROSS REFERENCE TO RELATED APPLICATIONS

The present application is the U.S. National Phase of PCT Application No. PCT/EP2017/081571, filed on Dec. 5, 2017, which claims the benefit of and priority to Italian Application No. 102016000123639, filed on Dec. 6, 2016, the contents of which are incorporated herein by reference in their entireties.

TECHNICAL SECTOR

The present invention relates to a method and a station for the skiving of the equatorial surface of the casing of a pneumatic tire during a retreading process of the same pneumatic tire.

The present invention finds advantageous application in the field of "truck" pneumatic tire retreading, to which the discussion that follows will make explicit reference without loss of generality.

BACKGROUND

Traditionally, after first use, "truck" pneumatic tires are retreaded, i.e., they are provided with a new tread in place of the old worn tread which is removed beforehand. The retreading of a "truck" pneumatic tire provides to eliminate the old worn tread mechanically from the used pneumatic tire in order to expose the "casing", and subsequently applying a new tread to the casing. The application of a new tread to the casing provides winding about the same casing both an intermediate strip or "cushion" of green rubber, and a "tread strip", which may be green or pre-vulcanized; the casing is then subjected to a vulcanization process in order to determine the optimum adhesion of the tread to the casing by means of the bonding action of the cushion.

After the old worn tread has been eliminated, an equatorial surface of the casing (and possibly also a sidewall of the casing) is subjected to a "skiving" which is carried out manually in order to remove any pre-existing local damage; such removal results in the formation of craters on the equatorial surface of the casing and then, after skiving, the equatorial surface of the casing is subjected to a "filling" which is carried out manually in order to fill such craters with green rubber. In order to allow for optimal adhesion of the green rubber to the casing, before the filling, on the equatorial surface of the casing a liquid layer (usually referred to as "cement" in English) based on green and normal-heptane rubber (or another organic solvent) can be deposited by means of spraying; the function of the cement is to promote the adhesion of the green rubber to the casing in order to prevent the green rubber from detaching from the casing.

The patent application US2012193012A1 describes a pneumatic tire casing equatorial surface skiving station that operates manually, i.e., it requires the intervention of an operator to manually perform the skiving of the equatorial surface of the casing after the removal of the worn out tread. The operator manually performs the skiving of the equatorial surface of the casing, identifying by himself (i.e., using his own eyes) the position of any local pre-existing damage that must be removed. This skiving operation results in the formation on the equatorial surface of the casing of craters of random and variable dimensions and positions which are subsequently manually filled with green rubber. Before the operator manually performs the skiving of the equatorial surface of the casing, a three-dimensional profile of the equatorial surface of the casing is captured by means of a laser profilometer; once the operator has manually performed the skiving of the equatorial surface of the casing, and before the operator fills the craters with green rubber, a second three-dimensional profile of the equatorial surface of the casing is captured by means of the same laser profilometer. The position of the craters on the equatorial surface of the casing is then determined by comparing the second three-dimensional profile with the first three-dimensional profile in order to identify geometric discontinuities; an automatic applicator device then applies cement (i.e., a liquid based on green and normal-heptane rubber or another organic solvent) to the equatorial surface of the casing only where craters have been identified by comparing the two three-dimensional profiles. In other words, the only automated operation (i.e., performed without manual intervention by the operator) is that of the application of the cement at the craters, while the identification of damage on the equatorial surface of the casing, the subsequent skiving of the equatorial surface of the casing (which results in the formation of craters), and the final filling of the craters with green rubber is performed by an operator in a completely manual manner.

The patent application EP0514162A2 describes a pneumatic tire casing equatorial surface skiving station that operates automatically, i.e., without the intervention of an operator, it autonomously performs the complete skiving of the equatorial surface of the casing after the removal of the worn out tread. The skiving station comprises a rotating member for carrying in rotation the casing, a main camera arranged perpendicularly to the equatorial surface of the casing for capturing digital images of the same equatorial surface, a control unit that analyzes the digital images of the equatorial surface of the casing in search of any damage, and a robotic arm that carries a grinding tool controlled by the control unit in order to skive the equatorial surface of the casing where there is damage that is identified by the analysis of the digital images. A secondary camera is also provided (coupled to a corresponding illuminator) which is carried by the robotic arm alongside the grinding tool and is used to capture a digital image of the details of the crater on the equatorial surface of the casing after the skiving operation; the digital image of the detail of the crater is analyzed by the control unit in order to verify whether casing plies are visible on the bottom of the crater (i.e., whether casing plies are exposed on the bottom of the crater). The information concerning any exposure of casing plies on the bottom of the crater is used to decide whether or not to continue with the skiving by means of the grinding tool (i.e., whether or not to interrupt the skiving by means of the grinding tool).

The patent application WO2010115711A1 describes a pneumatic tire casing equatorial surface skiving station that operates automatically, i.e., without the intervention of an operator, it autonomously performs the complete skiving of the equatorial surface of the casing after the removal of the worn out tread. The skiving station comprises a rotating member for carrying in rotation the casing, an infrared camera for capturing digital images of the equatorial surface of the casing, a control unit that analyzes the digital images of the equatorial surface of the casing in search of any damage on the same equatorial surface, and a robotic arm that carries a grinding tool and that is driven by the control unit in order to skive the equatorial surface of the casing where there is damage that is identified by the analysis of the digital images. When damage is detected within a digital image of the equatorial surface of the casing, the morphology of the same damage is compared against a reference library of similar damage; according to the most similar damage of reference, the grinding tool to be used is then chosen (the robotic arm can accommodate several different grinding tools) and the kind of skiving operation to be performed is chosen.

The patent application JP2008128790A describes a pneumatic tire casing equatorial surface skiving station that operates automatically, i.e., without the intervention of an operator, it autonomously performs the complete skiving of the equatorial surface of the casing after the removal of the worn out tread. The skiving station comprises a rotating member for carrying in rotation the casing, a camera arranged perpendicularly to the equatorial surface of the casing for capturing digital images of the same equatorial surface, an illuminator that is coupled to the camera and that emits blue light in order to highlight any damage, a control unit that analyzes the digital images of the equatorial surface of the casing in search of any damage, and an electronically controlled grinding tool driven by the control unit for skiving the equatorial surface of the casing where there is damage that has been identified by the analysis of the digital images.

However, it has been observed that known pneumatic tire casing equatorial surface skiving stations that operate automatically fail to be very effective in the identifying and/or recognition of damage; in other words, it has been observed that known automatic skiving stations sometimes fail to identify existing damage, they sometimes identify (falsely) simple surface stains as damage, and they sometimes fail to recognize the actual dimensions and shape of the damage.

SUMMARY

An object of the present invention is to provide a method and a station for the skiving of the equatorial surface of the casing of a pneumatic tire during a retreading process of the same pneumatic tire, which method and station are free of the drawbacks described above and which, in particular, are of easy and economical implementation.

According to the present invention a method and a station are provided for the skiving of the equatorial surface of the casing of a pneumatic tire during a retreading process of the same pneumatic tire as set forth in the appended claims.

BRIEF DESCRIPTION OF THE DRAWINGS

The present invention will now be described with reference to the attached drawings, illustrating a non-limiting exemplary embodiment, wherein.

PREFERRED EMBODIMENTS OF THE INVENTION

Figure 1:
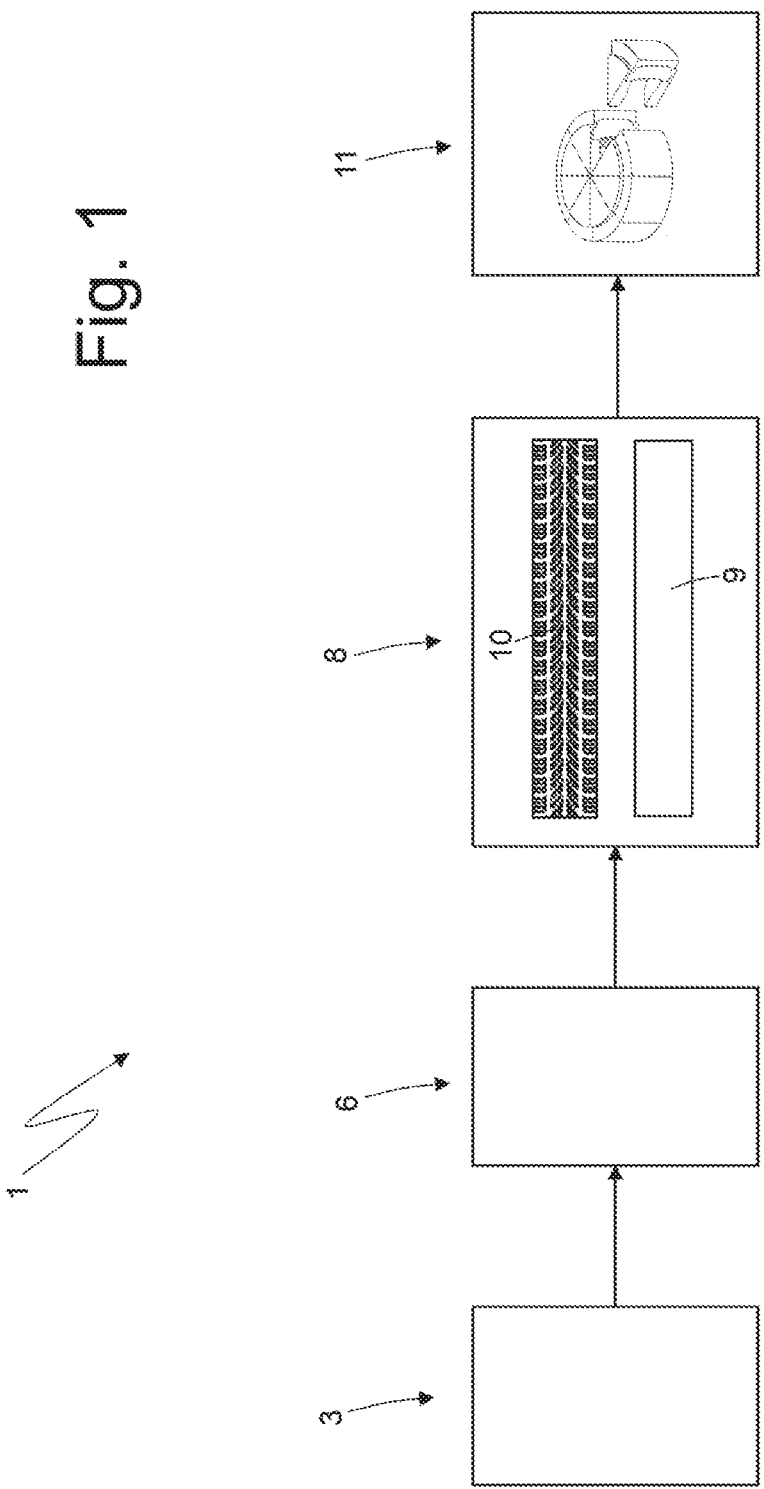
FIG. 1 schematically illustrates a pneumatic tire retreading plant.
Figure 2:
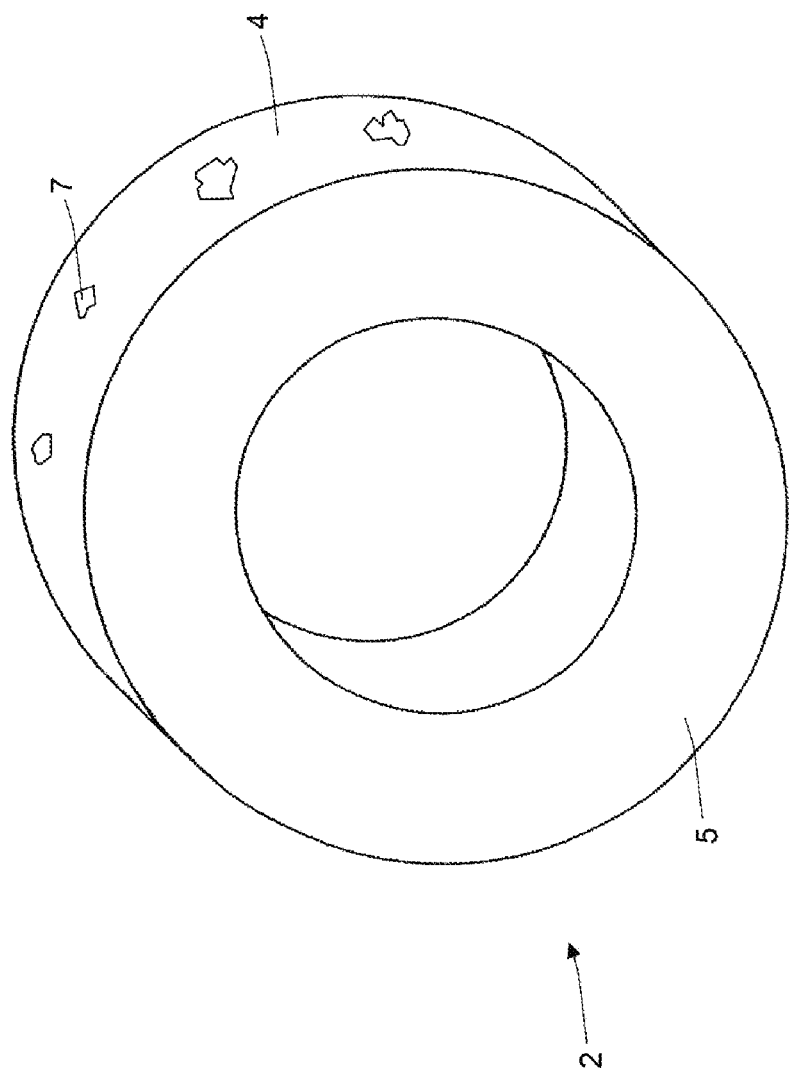
FIG. 2 is a perspective and schematic view of a pneumatic tire processed in the retreading plant in FIG. 1.

In FIG. 1, with the number 1, an entire "truck" pneumatic tire 2 retreading plant is indicated (illustrated in FIG. 2).

The retreading plant 1 comprises a removal station 3, wherein the old worn tread (not shown) is mechanically removed from the pneumatic tire 2, exposing an equatorial surface 4 (illustrated in FIG. 2) of a casing 5 of the pneumatic tire 2.

Furthermore, the retreading plant 1 comprises a skiving and filling station 6, wherein the equatorial surface 4 of the casing 5 is subjected to a skiving in order to remove any local damage; the skiving operation results in the formation on the equatorial surface 4 of the casing 5 of craters 7 (illustrated schematically in FIG. 2) of random and variable dimensions and positions which are subsequently filled with green rubber.

The retreading plant 1 comprises a winding station 8 whereto the casing 5 is transferred at the end of the filling; within the winding station 8, an intermediate strip or cushion 9 of green rubber and a tread strip 10 (which may be green or more frequently pre-vulcanized) are wound about the casing 5.

Finally, the retreading plant 1 comprises a vulcanization station 11, wherein the retreaded pneumatic tire 2 (i.e., provided with the tread strip 10) is vulcanized, thereby ending the retreading process.

Figure 3:
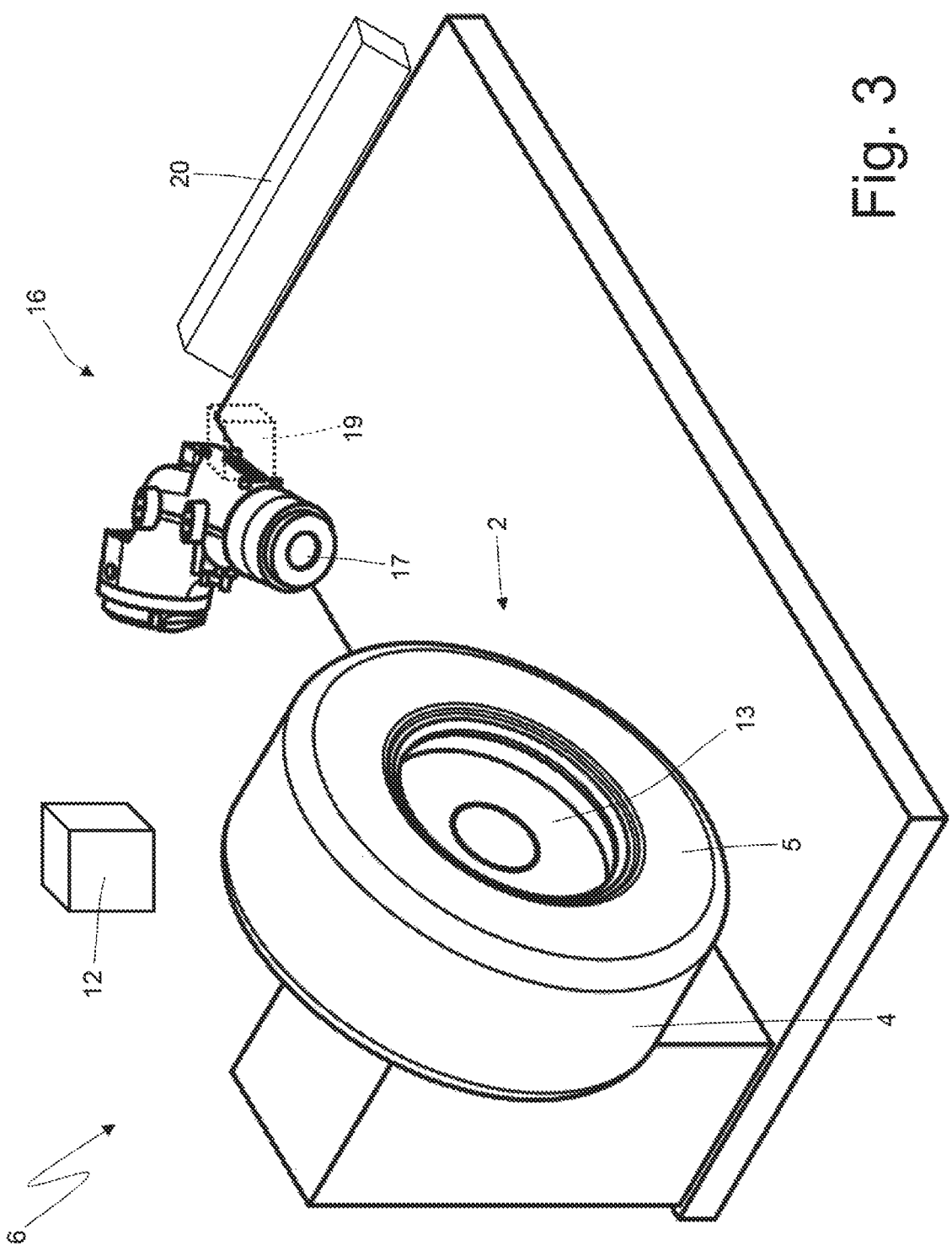
FIG. 3 is a perspective view, and with parts removed for clarity, of a skiving station in the retreading plant of FIG. 1 and made according to the present invention.
Figure 4:
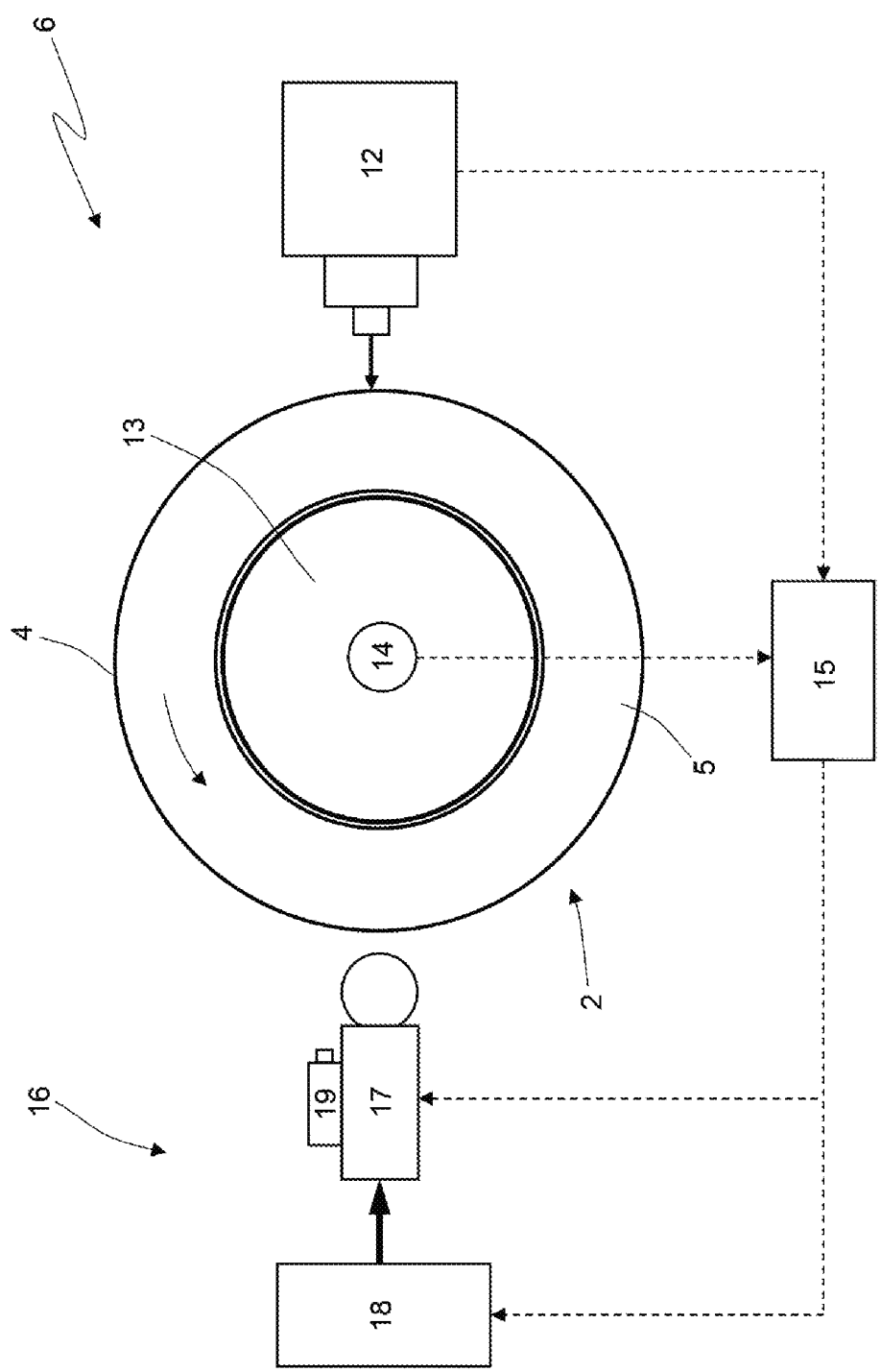
FIG. 4 is a schematic view of the skiving station of FIG. 3.

As illustrated in FIGS. 3 and 4, the skiving and filling station 6 comprises a laser type profilometer 12 (i.e., a three-dimensional scanner), which is arranged in a fixed position in front of the equatorial surface 4 of the casing 5 in order to capture a three-dimensional profile of the equatorial surface 4.

According to a preferred embodiment, the casing 5 is mounted on a motorized hub 13 that is suited to rotate the casing 5 around the longitudinal axis thereof and that is provided with an angular encoder 14 in order to measure in real time the angular position of the casing 5. To capture the three-dimensional profile of the equatorial surface 4, a control unit 15 drives a motorized hub 13 in order to make the casing 5 complete one revolution (i.e., a rotation angle of 360°) with a stepwise movement (i.e., presenting motion phases interleaved with stationary phases); corresponding to predetermined intervals of the angular position of the casing 5 (for example every 0.5°, 1° or 2°)—the amplitude thereof depending upon the required resolution—the profilometer 12 measures a distance between each point on the equatorial surface 4, arranged on a line parallel to the longitudinal axis, and the profilometer 12, scanning the equatorial surface 4 from shoulder to shoulder. In other words, to capture the three-dimensional profile of the equatorial surface 4 of the casing 5, a laser beam emitted by the profilometer 12 is cyclically moved in order to scan the equatorial surface 4 from shoulder to shoulder for every halt in the stepwise rotation of the casing 5 driven by the motorized hub 13.

In this way, the three-dimensional profile of the equatorial surface 4 of the casing 5 consists of a matrix that identifies each point on the equatorial surface 4 and provides the distance between each point on the equatorial surface 4 and the profilometer 12. That is to say, the three-dimensional profile of the equatorial surface 4 of the casing 5 consists of a matrix d ($\alpha_i$, $x_i$) that provides the distance d between the i-th point of the equatorial surface 4 and the profilometer 12, wherein the i-th point of the equatorial surface 4 is identified by the coordinate $\alpha_i$ (indicating the angle of rotation of the casing 5 in relation to a reference angle at the i-th point) and $x_i$ (indicating the axial position of the i-th point between the two shoulders of the casing 5).

The skiving and filling station 6 comprises an automatic skiving device 16 (i.e., controlled electronically), which is electronically controlled by the control unit 15 in order to remove that part of the rubber corresponding to each damaged area that has been previously identified and creating a corresponding crater 7. The automatic skiving device 16 comprises a tool 17 (interchangeable, as more fully described below), which is suited to remove the rubber of the casing 5 by means of mechanical abrasion (the tool 17 is normally a grinding wheel or milling cutter), and an electromechanical actuator 18 (schematically shown in FIG. 4) which is controlled by the control unit 15 and carries the tool 17 in order to move (typically by means of rototranslation on multiple axes) the tool 17. Typically, the electromechanical actuator 18 consists of a robotic arm having multiple degrees of freedom (preferably six) in order to allow the tool 17 to perform all possible machining operations on the casing 5.

The electromechanical actuator 18 also supports a digital camera 19 that is suited to capture digital color images, it is arranged next to the tool 17 and is connected to the control unit 15. The camera 19 is preferably coupled to an illuminator (usually LED) which is suited to project a white light at the area framed by the camera 19; generally, but not necessarily, the illuminator is mounted on the electromechanical actuator 18 next to the camera 19 and is accessed only during those short periods necessary for the acquisition of a digital image by means of the camera 19.

Finally, the skiving device 16 comprises a tool carrier 20, which is arranged next to the electromechanical actuator 18 in such a way as to allow the electromechanical actuator 18 to independently (automatically) change the tool 17; in other words, the electromechanical actuator 18 can deposit within the tool carrier 20 the tool 17 carried by the actuator 18 and can then withdraw a new tool 17 from the tool carrier 20.

According to a possible embodiment, the skiving and filling station 6 comprises an automatic spraying device which is electronically controlled by the control unit 15 in order to apply cement (i.e., a liquid based on green and normal-heptane rubber or another organic solvent) to the equatorial surface 4 of the casing 5 corresponding to those craters 7 opened by the previous skiving operation performed by the skiving device 16; the function of the cement being applied to the equatorial surface 4 is to promote adhesion of the green rubber intended to fill the craters 7. In use, the control unit 15 drives the motorized hub 13 in order to make the casing 5 complete one revolution (i.e., a rotation angle of 360°); at predetermined intervals of the angular position of the casing 5 (for example every 2°, 5° or 10°) the amplitude thereof depending upon the required resolution, if necessary the spraying device is activated in order to apply the cement only at those craters 7 opened during the previous skiving operation.

According to a possible embodiment, the skiving and filling station 6 comprises an automatic applicator device which is electronically controlled by the control unit 15 in order to apply green rubber to the equatorial surface 4 of the casing 5 at those craters 7 opened by the previous skiving operation performed by the skiving device 16; the function of the green rubber is to close the craters 7 in order to "equalize" (i.e. make uniform) the equatorial surface 4 of the casing 5 before the winding of the intermediate strip 9 of green rubber and of the tread strip 10 (green or prevulcanized). In use, the control unit 15 drives the motorized hub 13 in order to make the casing 5 complete one revolution (i.e., a rotation angle of 360°); at predetermined intervals of the angular position of the casing 5 (for example every 2°, 5° or 10°), the amplitude thereof depending upon the required resolution, if necessary the applicator device is activated in order to apply the green rubber to craters 7 opened in the previous skiving operation.

Hereinafter the operation of the skiving and filling station 6 will be described with reference to the identification and subsequent skiving of the damage on the equatorial surface 4 of the casing 5.

As described above, once the casing 5 has been mounted on the motorized hub 13 the control unit 15 performs the acquisition of the three-dimensional profile of the equatorial surface 4 of the casing 5 by means of the combined use of the motorized hub 13 (that rotates the casing 5 step by step) and of the profilometer (that scans the equatorial surface 4 of the casing 5 from shoulder to shoulder in order to determine the distance existing between the profilometer 12 and each point on the equatorial surface 4); once the control unit 15 has completed the acquisition of the three-dimensional profile of the equatorial surface 4 of the casing 5, the same control unit 15 determines the presence of any damage in the equatorial surface 4 of the casing 5 analyzing the three-dimensional profile of the equatorial surface 4 of the casing 5. In particular, the control unit 15 searches for the presence of discontinuities in the radial dimension of the equatorial surface 4 of the casing 5, i.e., the control unit 15 searches for areas where there is a localized variation in the radial dimension; the radial dimension is the distance exiting between the equatorial surface 4 of the casing 5 and the longitudinal axis of the pneumatic tire 2 (i.e., it coincides with the radius of equatorial surface 4 of the casing 5 in relation to the longitudinal axis of the pneumatic tire 2) and is complementary to the distance that exists between the equatorial surface 4 of the casing 5 and the profilometer 12 and is measured by the same profilometer 12 during the acquisition of the three-dimensional profile. In other words, the control unit 15 identifies as damage an area wherein the radial dimension (i.e., the radius) is significantly different from the average radial dimension (i.e., from the average radius).

From the operational point of view, the control unit 15 calculates both an average overall radial dimension (i.e., the entire equatorial surface 4 of the casing 5), and an average local radial dimension (for example, calculated within areas each having a width of 10-45°, i.e., that each extend to 2.7-12.5% of the entire equatorial surface 4). Subsequently, the control unit 15 searches for any points where the radial dimension significantly deviates (i.e., above a predetermined threshold) from the average radial dimension; the overall average radial dimension can be used in this comparison (i.e., extended over the entire equatorial surface 4 of the casing 5) and/or the local average radial dimension (i.e., limited to an area of the equatorial surface 4 of the casing 5). In this way, the control unit 15 searches for the presence of holes or crests in the equatorial surface 4 of the casing 5 and identifies such holes or crests as damage.

From a mathematical point of view, the search for damage on the equatorial surface 4 of the casing 5, is given by the following equations:

$$\Delta_i = |d_i(\alpha_i, x_i) - d_{AVG}|$$

$$\Delta_i > TH?$$

$\Delta_i$ variation in the radial dimension of the i-th point of the equatorial surface 4 of the casing 5;

$d_i$ radial dimension at the i-th point of the equatorial surface 4 of the casing 5;

$d_{AVG}$ average radial dimension (overall or local) of the equatorial surface 4 of the casing 5;

TH threshold value (pre-settable).

When the variation $\Delta_i$ of the radial dimension of the i-th point is greater than the threshold value TH, then, in correspondence with the i-th point, a hole or a crest (therefore damage) can be identified on the equatorial surface 4 of the casing 5; in order for a hole or a crest (and therefore damage) to be truly identified, it is obviously necessary for a number of adjacent points to exhibit a significant radial dimension variation $\Delta_i$ (i.e., greater than the threshold value TH). The minimum number of adjacent points that must exhibit the significant radial dimension variation $\Delta_i$ in order to be able to identify damage is generally variable and constitutes a pre-settable threshold.

Once all of the damage present in the equatorial surface 4 of the casing 5 has been identified by means of the analysis of the three-dimensional profile of the equatorial surface 4, the control unit 15 drives the skiving device 16 in order to perform the skiving of each point of damage. In order to skive a point of damage the control unit 15 preliminarily performs the recognition of the morphology (typology) of the damage by determining the salient characteristics of the damage (for example the average diameter, the extension, the average depth, the maximum depth) and by comparing the salient characteristics of the damage against a reference library (or a database) of damage in order to identify the closest damage of reference (i.e., the damage of reference that has the most similar morphology). On the basis of the most similar damage of reference, the tool 17 to be used is then chosen from between those tools 17 available within the tool-carrier 20, and the kind of skiving operation to be performed is chosen (for example how wide and deep the skiving operation must be). Once the tool 17 to be used and the method of operation has been chosen, the control unit 15 drives the motorized hub 13 in order to rotate the casing 5 in such a way as to arrange the damage in the optimal position in relation to the electromechanical actuator 18 (i.e., in the position wherein the electromechanical actuator 18 can most easily carry the tool 17 in order to operate on the damage), the control unit 15 then drives the electromechanical actuator 18 and the tool 17 in order to perform the skiving operation.

At the end of the damage skiving operation, the control unit 15 stops the tool 17 and drives the electromechanical actuator 18 such that the camera 19 frames the crater 7 that was generated by skiving the point of damage; at this point, the camera 19 takes (at least) a first digital color image of the crater 7 generated by the skiving of the damage. The first digital color image of the crater 7 generated by the skiving of the damage is analyzed by the control unit 15 in search of any traces of rust on the tread ply cords (if and when the tread plies are visible). For example, the search for any traces of rust is performed by searching for the presence of different coloring stains on the tread ply cords; in particular, the first digital color image is searched for the presence of stains with more or less red coloring, i.e., the digital color image is searched for the presence of traces having a kind of red coloring: within the casing 4, there should only be black (typical of rubber) or shiny gray (typical of the tread ply cords that are normally made of steel) colorings, and then the presence of red colorings (i.e., colorings having a non-negligible red component) is therefore inevitably linked to the presence of rust.

If the analysis of the first digital color image of the crater 7 generated by the skiving of the damage does not show the presence of rust on the tread ply cords, then the operation of skiving the damage is considered to be concluded; however, if the analysis of the first digital color image of the crater 7 generated by the skiving of the damage indicates the presence of rust on the tread ply cords, then a second deeper skiving operation is performed, which will result in the partial removal of the tread plies.

At the end of the second skiving operation, a second digital color image is captured of the crater 7 generated by the skiving of the damage and the presence of rust on the tread ply cords is again checked. If the analysis of the second digital color image of the crater 7 generated by the skiving of the damage does not show the presence of rust on the tread ply cords, then the operation of skiving the damage is considered to be concluded; however, if the analysis of the second digital color image of the crater 7 generated by the skiving of the damage indicates the presence of rust on the tread ply cords, then a third still deeper skiving operation is performed which will result in the further partial removal of the tread plies.

At the end of the third skiving operation, a third digital color image is captured of the crater 7 generated by the skiving of the damage and the presence of rust on the tread ply cords is again checked. If the analysis of the third digital color image of the crater 7 generated by the skiving of the damage does not show the presence of rust on the tread ply cords, then the operation of skiving the damage is considered to be concluded; however, if the analysis of the third digital color image of the crater 7 generated by the skiving of the damage indicates the presence of rust on the tread ply cords, then the retreading process is halted and the casing 4, insofar as it is not suitable for retreading (i.e., it is too compromised to be retreaded), is discarded.

The maximum number of skiving operations that are performed before deciding to discard a casing 4 is variable; the casing 4 may therefore be discarded after the first skiving operation, after the second skiving operation, after the fourth skiving operation, or after the fifth skiving operation.

The skiving and filling station 6 described above has numerous advantages.

In the first place the skiving and filling station 6 described above makes it possible to effectively and efficiently recognize damage present on the equatorial surface 4 of the casing 5; in other words, the damage present on the equatorial surface 4 of the casing 5 is effectively (i.e., without "false positives" that lead to the identification of simple surface stains as damage) and efficiently (i.e., without not-recognizing the damage actually present) identified. This result is obtained by virtue of the fact that the presence of damage is determined by analyzing the three-dimensional profile of the equatorial surface 4 of the casing 5 rather than a digital image of the equatorial surface 4 of the casing 5: significant radial dimension variations are searched for within the three-dimensional profile (i.e., the presence of holes or crests) and this search cannot in any way be influenced by surface stains that are substantially devoid of thickness, while in the analysis of a digital image it is possible for existing damage to be confused with a surface stain or vice versa.

Furthermore, the skiving and filling station 6 described above makes it possible to effectively and efficiently recognize the presence of rust on the bottom of the crater 7 generated by the skiving of the damage; in other words, the rust present on the bottom of the crater 7 is effectively (i.e., without "false positives" that lead to the identification of other types of surface stains such as rust) and efficiently (i.e., without failing to recognize the rust actually present) identified. This result is obtained by virtue of the fact that the presence of rust is searched for in searching for the presence of red or similar coloring within a digital color image captured by the camera 19.

Finally, the skiving and filling station 6 described above is relatively simple and inexpensive to implement, insofar as from a construction point of view it only uses commercial components (i.e., readily available on the market) and from a computational point of view it requires substantially modest processing power.

The invention claimed is:

1. Method for a skiving of an equatorial surface of a casing of a pneumatic tire during a retreading process of the same pneumatic tire, the method comprising the steps of:
removing the old worn tread from the pneumatic tire in order to expose the equatorial surface of the casing of the pneumatic tire;
electronically identifying the presence and location of any damage on the equatorial surface of the casing; and
skiving the equatorial surface of the casing where there is damage resulting in the formation on the equatorial surface of craters by means of an electronically controlled automatic skiving device that is driven as a function of the location of the damage on the equatorial surface of the casing;
the method is characterized in that:
the step of electronically identifying the presence and location of damage on the equatorial surface of the casing before skiving of the equatorial surface of the casing comprises the additional steps of:
capturing a single digital three-dimensional profile of the equatorial surface of the casing by means a profilometer; and
determining the presence and location of damage on the equatorial surface of the casing by analyzing the digital three-dimensional profile of the equatorial surface captured by profilometer; and,
the step of skiving the equatorial surface of the casing where there is damage comprises the additional steps of:
carrying a tool of the automatic skiving device to the point of damage in order to hollow out the equatorial surface of the casing and therefore create a corresponding crater;
capturing a first digital color image of the crater generated by skiving the damage by means of a digital color camera; and
analyzing the first digital color image in search of the presence of any rust inside the crater.

2. Method according to claim 1, wherein the step of capturing the digital three-dimensional profile of the equatorial surface:
of the casing comprises the further steps of:
mounting the casing on a motorized hub that is suited to rotate the casing around the longitudinal axis thereof and that is provided with an angular encoder in order to measure in real time the angular position of the casing;
arranging the profilometer in a substantially fixed position in front of the equatorial surface of the casing mounted on the hub;
stepwise rotating the casing in front of the profilometer; and
brushing the equatorial surface from shoulder to shoulder by means of the profilometer for every halt in the stepwise rotation.

3. Method according to claim 1, wherein the digital three-dimensional profile of the equatorial surface of the casing comprises a matrix that identifies each point on the equatorial surface and provides the distance between each point on the equatorial surface and the profilometer.

4. Method according to claim 1, wherein the step of determining the presence and location of damage on the equatorial surface of the casing comprises the further steps of:
calculating an average radial dimension of the equatorial surface of the casing; and
identifying the damage corresponding to an area of the equatorial surface wherein the radial dimension is different from the average radial dimension.

5. Method according to claim 1, wherein the search for any traces of rust within a digital image is performed in a search within the same digital image for the presence of traces of the color red.

6. Method according to claim 1, wherein the automatic skiving device is electronically controlled so as to remove part of a rubber where each damage is located and comprises:
the tool which is suited to remove the rubber of the casing by means of a mechanical abrasion;
an electromechanical actuator that carries the tool and that is suited to move the tool; and
the digital camera which is carried by the electromechanical actuator and which is arranged beside the tool.

7. Method according to claim 1 and comprising the further steps of:
if there is no rust inside the crater, terminating the skiving operation; or
if there is rust inside the crater further hollowing out the crater by means of the tool, capturing a second digital color image of the crater by means of the digital color camera, and analyzing the second digital color image in order to search for the presence of any rust inside the crater.

8. Method according to claim 7 and comprising the further steps of:
if there is no rust inside the crater, terminating the skiving operation; or
if there is rust inside the crater, further hollowing out the crater by means of the tool, capturing a third digital color image of the crater by means of the digital color camera, and analyzing the third digital color image in order to search for the presence of any rust inside the crater.

9. Method according to claim 8 and comprising the further steps of:
if there is no rust inside the crater, terminating the skiving operation; or
if there is rust inside the crater, interrupting the retreading for the pneumatic tire and discarding the same pneumatic tire.

10. A station for a skiving of a equatorial surface of a casing of a pneumatic tire during a retreading process of the same pneumatic tire; the station comprising:
an electronic control unit for identifying a presence and location of any damage on the equatorial surface of the casing; and
an electronically controlled automatic skiving device that comprises a tool and that is driven by the control unit as a function of the location of the damage on the equatorial surface of the casing for skiving the equatorial surface of the casing where there is damage resulting from the formation of craters on the equatorial surface;
the station is characterized in that:
a profilometer is provided for capturing a single digital three-dimensional profile of the equatorial surface of the casing before skiving of the equatorial surface of the casing;
the control unit determines the presence and location of damage on the equatorial surface of the casing by analyzing the digital three-dimensional profile of the equatorial surface captured by the profilometer;
the electronically controlled automatic skiving device carries the tool of the automatic skiving device to the point of damage in order to hollow out the equatorial surface of the casing and therefore create a corresponding crater; and the station captures a first digital color image of the crater generated by skiving the damage by means of a digital color camera and analyzes the first digital color image in search of the presence of any rust inside the crater.

* * * * *